United States Patent [19]

Dagiel

[11] 4,313,644
[45] Feb. 2, 1982

[54] THRUST BEARING ASSEMBLY

[75] Inventor: Richard T. Dagiel, Elkgrove Village, Ill.

[73] Assignee: Aetna Bearing Company, Chicago, Ill.

[21] Appl. No.: 109,223

[22] Filed: Jan. 3, 1980

[51] Int. Cl.³ .................... F16C 19/10; F16C 33/76
[52] U.S. Cl. ................................ 308/233; 192/110 B
[58] Field of Search ............... 308/176, 219, 230, 233, 308/234, 187.1; 192/110 B

[56] References Cited

U.S. PATENT DOCUMENTS

| | | | |
|---|---|---|---|
| 2,140,335 | 12/1938 | Schoenrock | 308/233 |
| 2,219,321 | 10/1940 | Katcher | 308/233 |
| 2,274,419 | 2/1942 | Katcher | 308/233 |
| 2,359,364 | 10/1944 | Katcher | 192/110 B |
| 2,403,460 | 7/1946 | Rozner | 308/233 |
| 3,272,576 | 9/1966 | Greby | 308/233 |
| 3,361,503 | 1/1968 | Greby | 308/233 |
| 4,046,436 | 9/1977 | Brown | 308/233 |

Primary Examiner—Richard R. Stearns
Attorney, Agent, or Firm—Trexler, Bushnell & Wolters, Ltd.

[57] ABSTRACT

A clutch throw-out bearing assembly includes a thrust bearing member having first and second spaced apart annular thrust rings and a plurality of bearing elements rotatably retained therebetween. An annular shell holds the spaced apart thrust rings in a fixed axial spaced relation to one another while permitting relative rotation therebetween. A carrier member mounts the thrust bearing assembly, one annular thrust ring being non-rotatably affixed to the carrier member. The shell is non-rotatably affixed to this one annular thrust ring, while the other annular thrust ring is rotatable relative to the shell. This other annular thrust ring also includes a bearing surface exposed outwardly on the shell for selective engagement and rotation in unison with portions of a clutch throw-out bearing assembly. An annular sealing ring or shim is interposed between the facing surfaces of the other thrust ring and of the shell.

5 Claims, 4 Drawing Figures

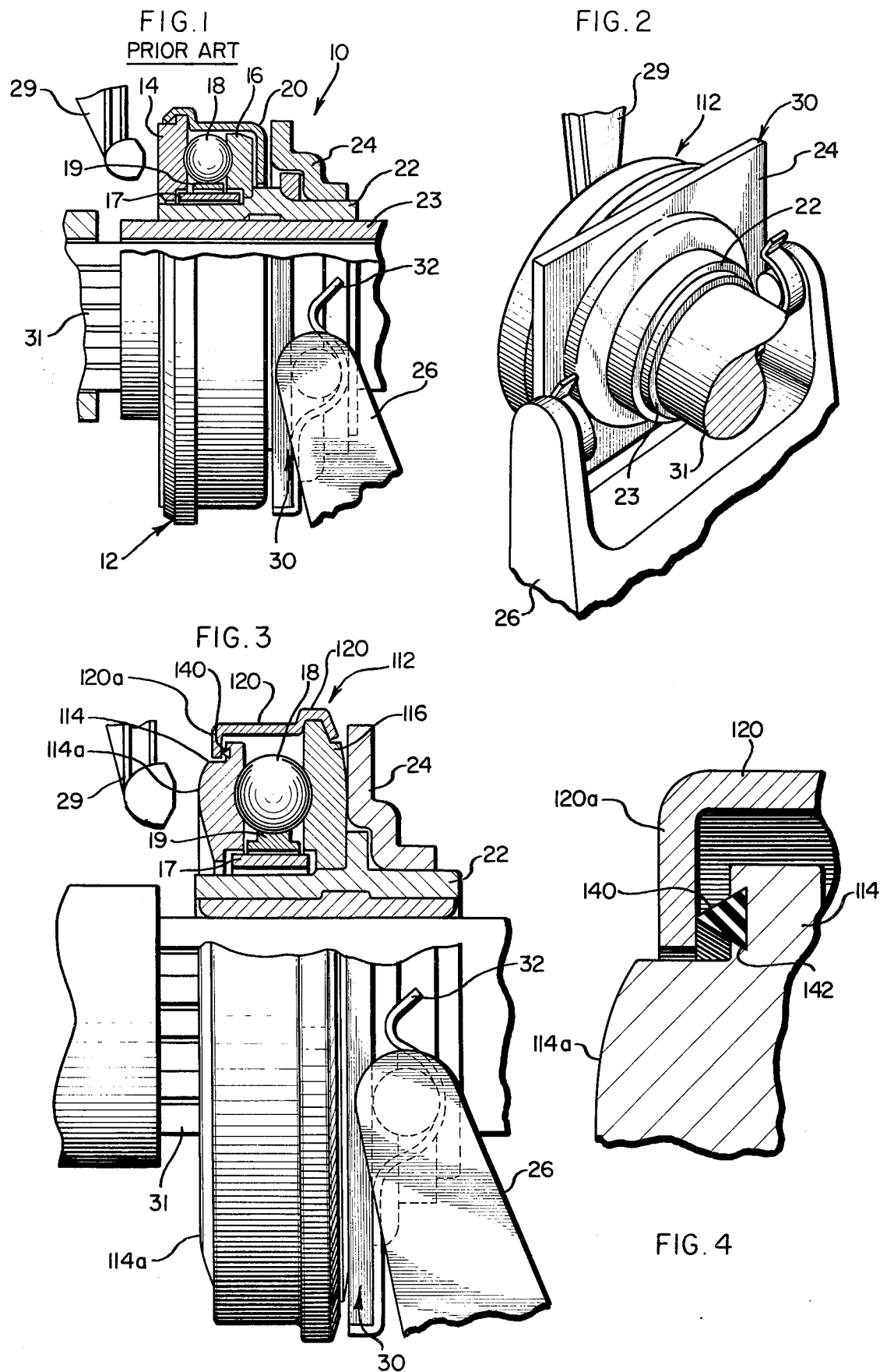

THRUST BEARING ASSEMBLY

BACKGROUND OF THE INVENTION

This invention relates generally to thrust bearings, and more particularly to sealed anti-friction thrust bearings. By way of example but not of limitation, bearings of said type are used in automobiles as clutch release or clutch throw-out bearings.

Generally speaking, automotive clutch throw-out bearings are well-known in the art. Their function is to provide a force transmitting member between the foot-operated clutch pedal and a plurality of rotating clutch release arms associated with the pressure plate on an automotive clutch. These clutch throw-out bearings are subjected to substantial forces over long periods of use and are consequently required to be of superior strength and durability to prevent premature failure. Moreover, these bearings are used in large quantities, and large scale manufacturing techniques are incorporated so as to minimize their cost to the automotive manufacturers. Typical such clutch throw-out bearings are disclosed and claimed, for example, in U.S. Pat. Nos. 3,909,086 and 4,046,436.

One important consideration in the design of such bearings is that of maintaining adequate amounts of lubricant over the relatively moving surfaces of the bearing. More particularly, it is important that the balls or other bearing elements retain a proper amount of grease or other lubricating material. In this regard, several characteristics in the operation of conventional thrust bearings tend to discourage rather than encourage such retention of lubricant. For example, in operation the rotation of the relatively rotatable parts of the bearing tend to generate heat which in turn encourages "bleed-down" of the grease or other lubricant which then comes into contact with the rotating surfaces and is thrown outwardly of the rotating surfaces. This outwardly thrown grease or other lubricant then tends to be caught upon the interior surface of the bearing shell, rather than on the balls or other bearing elements.

A second characteristic of many prior art thrust bearings is the tendency to experience "drop down" while in service. Briefly, by this it is meant that a normal amount of play or tolerance is conventionally encountered between the raceways provided for the balls or other bearing elements. This play allows some movement of the bearing elements away from their intended seating in the raceways so as to result in an accelerated rate of wear of these parts. In other words, the balls or other bearing elements tend to move somewhat out of the provided raceways and wear at their edges, sometimes resulting in premature failure of the bearing.

OBJECTS AND SUMMARY OF THE INVENTION

It is therefore a general object of the present invention to provide a new and improved thrust bearing for overcoming one or more of the above-discussed problems encountered in the prior art.

A more specific object is to provide a thrust bearing in accordance with the foregoing general objects which is specifically adapted to encourage the adequate lubrication of the balls or other bearing elements by substantially minimizing the phenomenom of bleed-down and subsequent outward migration or "throw-out" of the grease or other lubricants.

A further object is to provide a thrust bearing of the type stated which is adapted to reduce excessive play or tolerance in the rotatable retention of the balls or other bearing elements between the raceways or thrust rings.

Briefly, in accordance with one aspect of the invention, there is provided a thrust bearing including a bearing carrier member, first and second spaced apart generally annular thrust rings and a plurality of bearing elements rotatably retained therebetween, and generally annular retaining means for holding said spaced apart thrust rings in a fixed axially spaced relation to one another while permitting relative rotation therebetween about a common axis. The first thrust ring is of smaller outer diameter than the second annular thrust ring. Said annular retaining means includes a shell member non-rotatably affixed to said second annular thrust ring and extended over but not engaging the outer periphery of said first annular thrust ring so as to permit relative rotation therebetween, the second thrust ring being fixed with respect to the carrier member.

In accordance with another aspect of the invention, a novel thrust bearing comprises: first and second spaced apart annular thrust rings and a plurality of bearing elements rotatably retained therebetween, and annular retaining means for holding said spaced apart thrust rings in a fixed axial spaced relation to one another while permitting relative rotation therebetween and about a common axis, wherein the annular retaining means includes a shell member non-rotatably affixed to said second annular thrust ring and extending over a portion of said first annular thrust ring and further including generally annular sealing means interposed between said first annular thrust ring and said shell member so as to form a seal and maintain a close tolerance fit therebetween while still permitting substantially unimpeded relative rotation therebetween.

BRIEF DESCRIPTION OF THE FIGURES

FIG. 1 is a side elevation, partially cut-away and in section, of a prior art thrust bearing mounted for use as a clutch release or clutch throw-out bearing;

FIG. 2 is a perspective view of a thrust bearing according to the present invention, mounted as a clutch release or clutch throw-out bearing;

FIG. 3 is an enlarged side elevation, partially cut-away and in section, of the bearing of FIG. 2; and FIG. 4 is an enlarged view of a portion of the bearing of FIG. 3, revealing an additional feature of a preferred embodiment of the present invention.

DETAILED DESCRIPTION OF THE ILLUSTRATED EMBODIMENT

Turning first to FIG. 1, there is shown a typical prior art clutch throw-out bearing assembly designated generally by the reference numeral 10. Briefly, this clutch throw-out bearing assembly can be considered to comprise a bearing unit designated generally by the reference numeral 12 which is carried by a carrier member 30 adapted to be splined upon or otherwise fitted over a rotating shaft or quill 31 which is disposed inwardly of the bearing element 12.

Conventionally, the bearing unit 12 includes a pair of spaced apart, oppositely disposed thrust rings 14 and 16. Between these thrust rings 14 and 16 a plurality of bearing elements such as ball bearings 18 are rotatably retained. A rotary base ring 17 and inner liner 19 are provided in accordance with the well-known practice. The thrust rings 14 and 16 are maintained in assembled relation by a generally annular retaining member in the form of a shell member 20. In accordance with conventional practice, this shell member 20 is staked or otherwise non-rotatably affixed to the thrust ring 14 and surrounds but is spaced apart somewhat from thrust ring 16. Consequently, the thrust ring 14 and shell 20 are rotatable as a unit with respect to the thrust ring 16.

In accordance with the usual practice of prior art construction, the thrust ring 16 is non-rotatably mounted upon the carrier member 30, leaving the thrust ring 14 and shell 20 free to rotate with respect thereto. The carrier member 30 conventionally includes a generally annular slide or sleeve portion or member 23 which fits generally within the bearing member 12 for receiving the shaft or quill 31, and a carrier plate member or portion 24 mounted or formed in surrounding relation to the sleeve or slide member or portion 22. This carrier plate 24 is provided with suitable gripping devices such as clips 32 for securing or attaching the carrier plate 24 to a clutch fork assembly 26.

This clutch fork assembly is movable generally in an axial direction with respect to the axis of the bearing 12 so as to provide axial movement of the thrust bearing. Such axial movement of the thrust bearing in direction of the clutch throw-out plate will cause the open or exposed face of the thrust ring 14 to engage a plurality of rotating clutch release arms or fingers such as the illustrated finger 29 in a conventional fashion to displace the pressure plate (not shown) from the fly wheel (not shown) of the automotive vehicle, thereby disengaging the engine from the transmission and differential.

Referring now to FIGS. 2 and 3, the bearing assembly according to the present invention will be described, utilizing like reference numerals for those parts which are similar to the parts in the above description of the conventional or prior art bearing assemblies. A carrier member 30 comprising a carrier plate portion 24 and a sleeve or slide portion 22 mounts a bearing member 112 constructed in accordance with the principle of the present invention. The carrier plate 24 is provided with suitable clamps 32 or other similar devices for mounting to a clutch fork assembly 26, which operates in the same fashion described above to move the bearing member 12 into and out of contact with rotating clutch release arms or fingers 29. The shaft or quill 31 similarly fits through the opening of the bearing member 112 substantially without frictional engagement therebetween, in accordance with the conventional practice.

A pair of spaced apart annular thrust rings 114 and 116 retain a plurality of bearing elements such as ball bearings 18 therebetween. A retaining member in the form of a shell member 120 holds the spaced apart thrust rings 114 and 116 in a fixed axial spaced relation to one another while permitting relative rotation therebetween about a common axis. This shell member 120 is non-rotatably affixed to the inner (relative to plate 24) thrust ring 116. It will be noted that it is this inner thrust ring 116 which is in turn non-rotatably affixed to the carrier assembly or member 30 and more specifically to the sleeve or slide member 22 thereof. Thus, the thrust ring 116 and hence the sleeve 112 are held in a non-rotatable condition with respect to carrier member 30 and consequently with respect to the clutch fork assembly 26.

Moreover, the shell member 120, although it surrounds or encloses a portion of the remaining or outer (again, with respect to the plate 24) thrust ring 114, nonetheless permits relative rotation of this outer thrust ring 114. Consequently the outer face or surface 114a of thrust ring 114 is free to contact and rotate in unison with the clutch release arms or fingers 29.

In accordance with a preferred form of the invention, the thrust ring 114 is of relatively smaller outer diameter than that of the inner thrust ring 116, thereby permitting a thrust ring 116 and shell member 120 to be assembled together therewith to form the novel bearing member 112 in accordance with the present invention. Moreover, a conventional rotary base ring 17 and inner liner 19 may also be provided in conjunction with the bearing member 112.

In accordance with a preferred embodiment of the invention, a novel sealing arrangement is also provided as between the outer thrust ring 114 and the shell member 120. Referring now also to FIG. 4, it will be seen that a generally annular sealing member or shim 140 is mounted in a complimentary receiving annular slot or undercut groove 142 in a surface of thrust ring 114 which generally faces a downwardly extending flange portion 120a of the shell member 120. In a preferred form, this sealing member or ring 140 is generally triangular in cross section, the base portion thereof being retained within the groove or slot 142 and the apical portion thereof being in contact with the shell member 120. Preferably, this ring 140 is formed from a material having a relatively low coefficient of friction such as Teflon (a polytetrafluoroethylene resin) or other like material.

Having described the structure of the invention, the advantages thereof in avoiding or minimizing the problems of the prior art discussed above will be appreciated by those skilled in the art. Briefly, it will be recognized that the provision of the relatively smaller rotating mass of the single thrust ring 114, as opposed to the prior art (see FIG. 1) provision of a relatively larger rotating mass of thrust ring 14 combined with shell member 20, causes less tendency of grease to migrate radially outwardly. Additionally, the provision in the preferred embodiment of a significantly smaller outer diameter rotating or outer thrust ring 114 contributes favorably in this regard. Generally speaking, there is less tendency for grease to so migrate because a smaller rotating mass not only creates a smaller centrifugal acceleration for any grease residing thereon or thereabout but also tends to generate less heat in operation, thus minimizing the "bleed-down" phenomena heretofore discussed. Moreover, it is believed that this lesser rotating mass may further contribute to longer life of the bearing assembly 112 in that it also minimizes both the amount of vibration such that the relative surfaces which are closely adjacent to one another during rotation may not be subject to excessive friction, or even scraping or scarring from such vibration.

Additionally, the provision of the novel sealing member or shim 140 encourages a closer tolerance or tighter bearing assembly, substantially eliminating relative play between the thrust ring 114 and shell 120. Hence, a closer engagement between the raceways formed on the inner surfaces of thrust rings 114 and 116 and the bearing elements or balls 118 is also maintained. This improved engagement aids in retaining the balls within their intended raceways or racepaths and thus helps eliminate undue wear, vibration or the like.

Moreover, it will be seen that the provision of the sealing member or shim 140 not only retains the grease or other lubricant within the bearing due to the sealing action thereof but also cooperates with the structure already described in avoiding the "bleed-down" and "throw-out" problems. This is true because the better tolerance fit and elimination of play also tends to eliminate a good deal of vibration and/or other friction-inducing movements between the ball 18 and its intended raceway in the thrust rings 114 and 116.

The invention is claimed as follows:

1. A thrust bearing including a bearing carrier member, first and second spaced apart generally annular thrust rings and a plurality of bearing elements rotatably retained therebetween, and generally annular retaining means for holding said spaced apart thrust rings in a fixed axially spaced relation to one another while permitting relative rotation therebetween about a common axis, the first thrust ring is of smaller outer diameter than the second annular thrust ring, said annular retaining means includes a shell member non-rotatably affixed to said second annular thrust ring and extending over but not engaging the outer periphery of said first annular thrust ring so as to permit relative rotation therebetween, the second thrust ring being fixed with respect to the carrier member, a generally annular sealing member forming a seal and for maintaining a relatively close tolerance fit between said first annular thrust ring and said shell member, and wherein said annular sealing member is non-rotatably affixed to said first annular thrust ring and presents a minimal surface to said shell member so as not to inhibit substantially relative rotation therebetween.

2. A thrust bearing including a bearing carrier member, first and second spaced apart generally annular thrust rings and a plurality of bearing elements rotatably retained therebetween, and generally annular retaining means for holding said spaced apart thrust rings in a fixed axially spaced relation to one another while permitting relative rotation therebetween about a common axis, the first thrust ring is of smaller outer diameter than the second annular thrust ring, said annular retaining means includes a shell member non-rotatably affixed to said second annular thrust ring and extending over but not engaging the outer periphery of said first annular thrust ring so as to permit relative rotation therebetween, the second thrust ring being fixed with respect to the carrier member, a generally annular sealing member forming a seal and for maintaining a relatively close tolerance fit between said first annular thrust ring and said shell member, and wherein said annular sealing member is generally triangular when viewed in cross-section, the base of the triangle thus defined being retained in an annular groove formed in a surface of said first annular thrust ring facing said shell member, and the apex of the triangle thus defined being in contact with the facing surface of said shell member.

3. A thrust bearing as set forth in claim 1 or 2 wherein said annular sealing member comprises a material having a relatively low coefficient of friction.

4. A thrust bearing comprising in combination: first and second spaced apart annular thrust rings and a plurality of bearing elements rotatably retained therebetween, and annular retaining means for holding said spaced apart thrust rings in a fixed axial spaced relation to one another while permitting relative rotation therebetween and about a common axis, wherein the annular retaining means includes a shell member non-rotatably affixed to said second annular thrust ring and extended over a portion of said first annular thrust ring and further including generally annular sealing means interposed between said first annular thrust ring and said shell member so as to form a seal and maintain a close tolerance fit therebetween while still permitting substantially unimpeded relative rotation therebetween, said annular sealing member being nonrotatably affixed to said first annular thrust ring and presenting a minimal surface to said shell member so as not to inhibit substantially relative rotation therebetween.

5. A thrust bearing as set forth in claim 4 wherein the first annular thrust ring is of relatively smaller outer diameter than the second annular thrust ring.

* * * * *